US009442361B2

(12) United States Patent
Kim et al.

(10) Patent No.: US 9,442,361 B2
(45) Date of Patent: Sep. 13, 2016

(54) ADDITIONAL EFFECT SYSTEM AND METHOD FOR MULTI-PROJECTION

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 14/345,172

(22) PCT Filed: Oct. 25, 2013

(86) PCT No.: PCT/KR2013/009549
§ 371 (c)(1),
(2) Date: Mar. 14, 2014

(87) PCT Pub. No.: WO2014/077524
PCT Pub. Date: May 22, 2014

(65) Prior Publication Data
US 2014/0354954 A1 Dec. 4, 2014

(30) Foreign Application Priority Data
Nov. 19, 2012 (KR) ........................ 10-2012-0130822

(51) Int. Cl.
*G03B 21/14* (2006.01)
*G03B 31/00* (2006.01)
(Continued)

(52) U.S. Cl.
CPC ................. *G03B 31/00* (2013.01); *A47C 1/12* (2013.01); *A47C 3/18* (2013.01); *A63J 25/00* (2013.01); *E04H 3/22* (2013.01); *G02B 27/2271* (2013.01); *G03B 21/003* (2013.01); *G03B 21/14* (2013.01);
(Continued)

(58) Field of Classification Search
CPC ................... H04N 21/41415; H04N 5/23238; A63J 2005/001; A63J 5/02; G03B 37/04; E04H 3/22
USPC ............... 352/40, 48, 85, 88, 87, 89, 69, 70; 52/6–10; 472/60; 353/28, 30, 94
See application file for complete search history.

(56) References Cited

U.S. PATENT DOCUMENTS 1,749,187 A * 3/1930 Leavell ........................... 352/85
2,861,806 A * 11/1958 Disney ............................ 472/60
(Continued)

FOREIGN PATENT DOCUMENTS

CN 101426993 A 5/2009
EP 0258619 A2 3/1988
(Continued)

OTHER PUBLICATIONS

Korean Office Action for application No. 10-2012-0130822 dated Apr. 23, 2014.
(Continued)

*Primary Examiner* — William C Dowling
(74) *Attorney, Agent, or Firm* — Hauptman Ham, LLP

(57) ABSTRACT

The present invention provides an additional effect system and method, the additional effect system including: a plurality of projection surfaces installed in a single theater; and an additional effect device for implementing an additional effect other than images projected on the plurality of projection surfaces, wherein the additional effect device provides the additional effect depending the images projected on the plurality of projection surfaces.

15 Claims, 8 Drawing Sheets

Projecting images on plural projection surfaces installed in single theater and implementing additional effect other than images — S10

Allowing images projected on plural projection surfaces to change — S11

Allowing direction of additional effect to change in association with change in images projected on plural projection surfaces — S12

(51) Int. Cl.

| | |
|---|---|
| ***H04N 21/41*** | (2011.01) |
| ***H04N 5/445*** | (2011.01) |
| ***E04H 3/22*** | (2006.01) |
| ***G03B 21/56*** | (2006.01) |
| ***H04N 9/31*** | (2006.01) |
| ***G02B 27/22*** | (2006.01) |
| ***G03B 21/26*** | (2006.01) |
| ***G03B 21/608*** | (2014.01) |
| ***A47C 1/12*** | (2006.01) |
| ***A47C 3/18*** | (2006.01) |
| ***A63J 25/00*** | (2009.01) |
| ***G03B 29/00*** | (2006.01) |
| ***G03B 41/00*** | (2006.01) |
| ***G03B 21/00*** | (2006.01) |
| ***G03B 21/20*** | (2006.01) |
| ***G03B 21/60*** | (2014.01) |
| *A63J 5/00* | (2006.01) |
| *G03B 37/04* | (2006.01) |

(52) U.S. Cl.

CPC ......... *G03B 21/206* (2013.01); *G03B 21/2053* (2013.01); *G03B 21/26* (2013.01); *G03B 21/56* (2013.01); *G03B 21/60* (2013.01); *G03B 21/608* (2013.01); *G03B 29/00* (2013.01); *G03B 41/00* (2013.01); *H04N 5/44591* (2013.01); *H04N 9/3147* (2013.01); *H04N 9/3182* (2013.01); *H04N 9/3185* (2013.01); *H04N 9/3194* (2013.01); *H04N 21/4122* (2013.01); *A63J 2005/002* (2013.01); *G03B 37/04* (2013.01)

(56) References Cited

U.S. PATENT DOCUMENTS

| | | | | |
|---|---|---|---|---|
| 3,469,837 | A * | 9/1969 | Heilig | 472/60 |
| 3,973,839 | A * | 8/1976 | Stumpf et al. | 352/5 |
| 4,838,344 | A * | 6/1989 | Murakami | 165/48.1 |
| 4,962,420 | A | 10/1990 | Judenich | |
| 5,573,325 | A * | 11/1996 | Lekowski | 353/79 |
| 5,602,978 | A | 2/1997 | Lastinger | |
| 5,765,314 | A * | 6/1998 | Giglio et al. | 52/7 |
| 5,964,064 | A * | 10/1999 | Goddard et al. | 52/8 |
| 6,665,985 | B1 | 12/2003 | Hennes | |
| 6,848,219 | B2 * | 2/2005 | Standard et al. | 52/6 |
| 7,065,418 | B2 * | 6/2006 | Standard | E04H 3/22 348/E7.063 |
| 7,857,461 | B2 * | 12/2010 | Kondo | H04N 5/74 353/121 |
| 7,905,606 | B2 * | 3/2011 | Bullock | G03B 21/00 353/69 |
| 8,164,930 | B2 * | 4/2012 | Tan et al. | 363/44 |
| 8,231,225 | B2 * | 7/2012 | LaDuke | G03B 21/14 353/121 |
| 8,506,090 | B2 * | 8/2013 | Nicoli | G06F 1/1626 353/122 |
| 8,714,746 | B2 * | 5/2014 | Choi et al. | 353/30 |
| 8,730,322 | B2 * | 5/2014 | Rondinelli et al. | 348/143 |
| 8,807,762 | B2 * | 8/2014 | Uchiyama | G03B 21/00 345/589 |
| 9,004,698 | B2 * | 4/2015 | Kilcher | G01S 7/4814 353/121 |
| 2007/0115440 | A1 * | 5/2007 | Wiklof | G03B 21/14 353/69 |
| 2009/0115916 | A1 | 5/2009 | Kondo et al. | |
| 2011/0001935 | A1 * | 1/2011 | Reale | G03B 21/14 353/28 |
| 2014/0320828 | A1 * | 10/2014 | Kim et al. | 353/94 |
| 2014/0340647 | A1 * | 11/2014 | Kim et al. | 352/40 |

FOREIGN PATENT DOCUMENTS

| | | | |
|---|---|---|---|
| JP | 05200163 | | 8/1993 |
| JP | 1993200163 | A | 8/1993 |
| JP | 1994086384 | A | 3/1994 |
| JP | 2000140458 | A | 5/2000 |
| JP | 2005202381 | A | 7/2005 |
| KR | 1020030084948 | A | 11/2003 |
| KR | 2003629230000 | | 9/2004 |
| KR | 200383828 | | 5/2005 |
| KR | 101075122 | A | 10/2011 |
| WO | 9849599 | A1 | 11/1998 |
| WO | 02068777 | A1 | 9/2002 |

OTHER PUBLICATIONS

International Search Report mailed Feb. 12, 2014 for PCT/KR2013/009549.

Korean Office Action for application No. 10-2012-0130822, dated Dec. 16, 2013.

International Search Report mailed Feb. 12, 2014 for PCT/KR2013/009673.

Supplementary European Search Report received Nov. 12, 2015 for corresponding European Application No. 13855879.6.

Chinese Office Action issued on Mar. 28, 2016 corresponding to Chinese Application No. 201380003486.8.

* cited by examiner

ADDITIONAL EFFECT SYSTEM AND METHOD FOR MULTI-PROJECTION

TECHNICAL FIELD

The present invention relates to an additional effect system and method for multi-projection and, more particularly, to an additional effect system and method, which can configure the direction of an additional effect differently in association with a change in images projected on a plurality of projection surfaces.

BACKGROUND ART

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing audiences with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and the audience wears glasses with polarizing filters such that different images are presented to the left and right eyes during watching.

However, while these 3D technologies can provide audiences with 3D images, the audiences just watch the images reproduced on a single screen, which may reduce the degree of involvement in the images. Moreover, the direction of the 3D effect that the audiences feel is limited to the direction of the single screen.

Furthermore, according to the conventional 3D technologies, the audiences must wear the glasses equipped with polarizing filters during watching, which may make the audiences feel inconvenient, and different images are artificially presented to the left and right eyes, which may make some sensitive audiences feel dizzy or nausea.

Therefore, a so-called "multi-projection system" which can solve the problems of the conventional projection systems based on a single screen has been proposed. The "multi-projection system" refers to a technology in which a plurality of projection surfaces are arranged around audience seats such that synchronized images are reproduced on the plurality of projection surfaces, thus providing audiences with the three-dimensional effect and immersion.

Meanwhile, it is necessary to provide characteristics that can be associated with the multi-projection to additional effects such as sound, wind, scent, etc. other than the image so as to maximize the 3D effect and immersion that audiences can feel from the "multi-projection system". However, there is no technology for the additional effects that can be associated with the multi-projection system.

Therefore, there is a need to develop a system that can provide additional effects such as sound, wind, scent, temperature, etc. in a new perspective in association with the "multi-projection system" including the plurality of projection surfaces.

DISCLOSURE OF INVENTION

Technical Problem

An object of the present invention is to provide an additional effect system which can be associated with a multi-projection system including a plurality of projection surfaces and can provide audiences with maximized three-dimensional effect and immersion.

Solution to Problem

To achieve the above object, an additional effect system in accordance with an embodiment of the present invention may comprise: a plurality of projection surfaces installed in a single theater; and an additional effect device for implementing an additional effect other than images projected on the plurality of projection surfaces, wherein the additional effect device provides the additional effect depending the images projected on the plurality of projection surfaces.

Here, the additional effect device may configure the direction of the additional effect differently depending on the images projected on the plurality of projection surfaces.

When an object in the image moves between the projection surfaces, the additional effect device may change the direction of the additional effect.

When an environment in the image relatively changes between the projection surfaces, the additional effect device may change the configuration of the direction of the additional effect.

When a specific event in the image occurs only on a specific projection surface among the plurality of projection surfaces, the additional effect device may implement the additional effect only in a direction that starts from the corresponding projection surface.

The plurality of projection surfaces may reproduce synchronized images.

The additional effect system may comprise two or more additional effect devices, and the two or more additional effect devices may be selectively operated to change the direction of the additional effect.

The additional effect system may further comprise an additional effect management device which controls the two or more additional effect devices either simultaneously or individually.

The additional effect management device may transmit a control signal to each additional effect device, and the control signal may include time information and operation information.

Each additional effect device may be synchronized with other additional effect devices and the images, projected on the plurality of projection surfaces, based on the time information.

The additional effect may include sound, wind, smell, fog, temperature change, laser, light, water jet, vibration, or bubbles.

The additional effect may be sound, the additional effect device may comprise two more speakers, and the two or more speakers may be distributed in the single theater.

When an object in the image moves between the projection surfaces, the additional effect system may change the output direction of sound associated with the corresponding object through the two or more speakers.

When an environment in the image relatively changes between the projection surfaces, the additional effect system may change the output direction of sound associated with the corresponding environment through the two or more speakers.

When a specific event in the image occurs only on a specific projection surface among the plurality of projection surfaces, the additional effect system may output the sound associated with the event only from a speaker installed in the direction of the specific projection surface.

The additional effect may be wind, the additional effect device may comprise two more air blowers, and the two or more air blowers may be distributed in the single theater.

When an object in the image moves between the projection surfaces, the additional effect system may change the direction of the wind through the two or more air blowers.

When an environment in the image relatively changes between the projection surfaces, the additional effect system may change the direction of the wind through the two or more air blowers.

The additional effect may be vibration, the additional effect device may comprise two more vibration devices, and the two or more vibration devices may be distributed on the floor of the theater.

The two or more vibration devices may provide the directionality of a vibration effect by sequential operation.

When an object in the image moves between the projection surfaces, the additional effect system may change the direction of the vibration through the two or vibration devices.

Moreover, to achieve the above object, an additional effect method in accordance with an embodiment of the present invention may comprise the steps of: (a) allowing multi-projection images to be projected on a plurality of projection surfaces installed in a single theater and allowing additional effect other than the images to be implemented; (b) allowing the images projected on the plurality of projection surfaces to change; and (c) allowing the additional effect to be provided as the images projected on the plurality of projection surfaces change.

Advantageous Effects of Invention

The present invention can provide three-dimensional directionality to the additional effects such as sound, smell, temperature, wind, etc. other than visual images, thus providing audiences with maximized three-dimensional effect and immersion.

Moreover, when the three-dimensional directionality is provided to the additional effects such as sound, smell, temperature, wind, etc., the present invention can provide three-dimensional directionality in a direction that matches a change in viewpoint of multi-projection images projected on a plurality of projection surfaces. Therefore, the present invention can provide audiences with the images of various viewpoints as well as the additional effects of various directionalities that match these images, thus providing the audiences with maximized three-dimensional effect and immersion.

Furthermore, the present invention can create a so-called multidirectional sense (smell, hearing, touch, etc.) associated with the multi-projection images, thus allowing audiences to feel as if they are actually present in a space created by the images.

MODE FOR THE INVENTION

Hereinafter, an additional effect system and method for multi-projection according to the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Next, an additional effect system according to the present invention will be described with reference to FIGS. 1 to 8.

Figure 1:
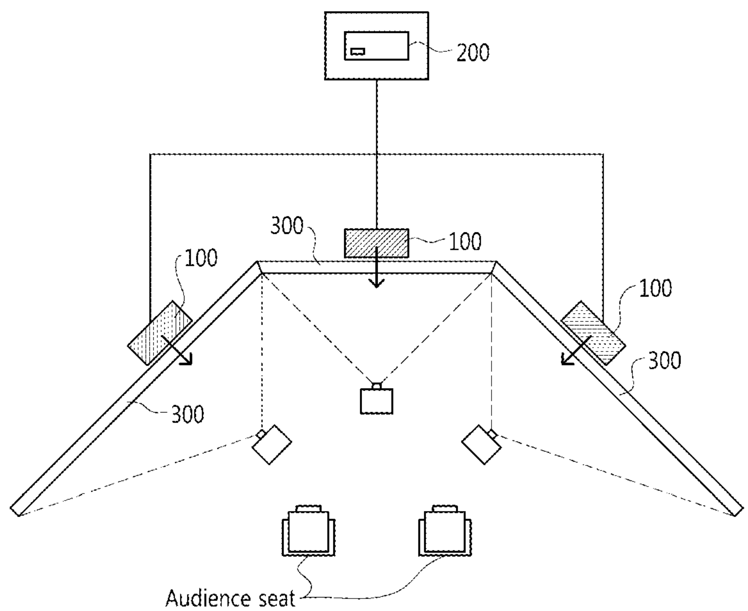
FIG. 1 is a diagram showing the configuration of an additional effect system in accordance with an embodiment of the present invention.
Figure 2:
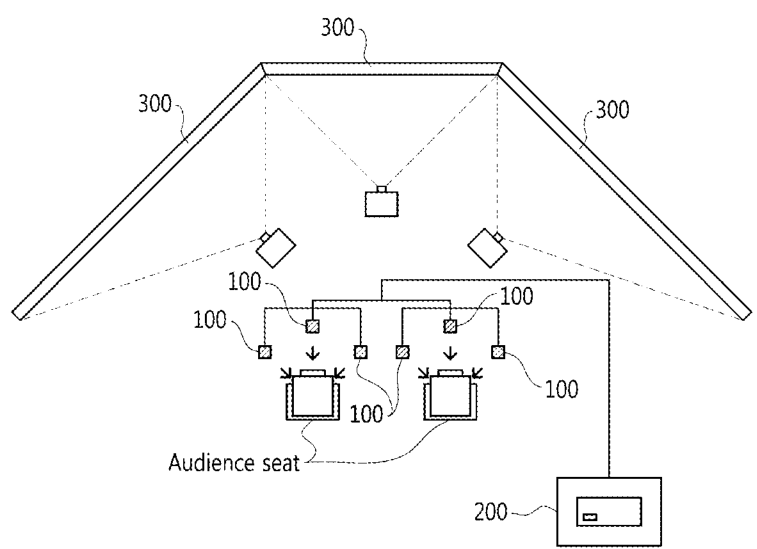
FIG. 2 is a diagram showing the configuration of an additional effect system in accordance with another embodiment of the present invention.

Referring to FIGS. 1 and 2, the additional effect system according to the present invention may comprise a plurality of projection surfaces 300 which are installed in a single theater, two or more additional effect devices 100 which implement additional effects other than images projected on the plurality of projection surfaces, and an additional effect management device 200 which controls the two or more additional effect devices 100.

Here, the additional effect device 100 can configure the direction of the additional effect differently depending on the images projected on the plurality of projection surfaces 300.

Moreover, it is preferable that two or more additional effect devices 100 are installed in the single theater, and the directionality of the additional effects can be implemented in various manners by the operational configuration of the two or more additional effect devices 100.

The plurality of projection surfaces 300 are provided for multi-projection in a single theater. A plurality of images may be reproduced on the plurality of projection surfaces 300. Here, the images reproduced on the plurality of projection surfaces 300 may be synchronized with each other based on a synchronization signal. In this case, it is preferable that the images reproduced on the plurality of projection surfaces 300 generally create a unified image. In detail, while different images may be reproduced on the respective projection surfaces 300, it is preferable that the different images are associated with each other to create a unified image when viewed over the entire projection surface.

Of course, according to the embodiments, separate images (e.g., a main image, a descriptive image for the main image, etc.) may be projected on the plurality of projection surfaces 300.

Moreover, the plurality of projection surfaces 300 may be arranged so as not to be parallel to each other. According to the prior art, an image is projected only on a screen placed in front of a theater such that an audience watches the image reproduced on the two-dimensional screen or a 3D technology is applied to the image itself reproduced on a plane. On the contrary, according to the present invention, the plurality of projection surfaces 300 are three-dimensionally arranged so as not to be parallel to each other, and thus it is possible to provide the audience with a three-dimensional image with high three-dimensional effect and immersion through the three-dimensionally arranged plurality of projection surfaces 300 without applying the 3D technology to the image itself.

Moreover, it is preferable that the plurality of projection surfaces 300 are arranged to surround the audience seats in the theater. Therefore, the audiences can feel as if they are in a space created by the synchronized images reproduced on the plurality of projection surfaces 300, and thus the three-dimensional effect, immersion, and virtual reality that the audiences feel can be maximized.

Furthermore, the angle between the projection surfaces 300 is not limited to a specific angle, and the plurality of projection surfaces 300 may be arranged at various angles as long as the audiences can feel the three-dimensional effect.

In addition, the plurality of projection surfaces 300 may be arranged to be adjacent to each other or to be spaced from each other and, even in this case, it is preferable that the plurality of projection surfaces 300 are arranged to surround the audience seats.

Figure 6:
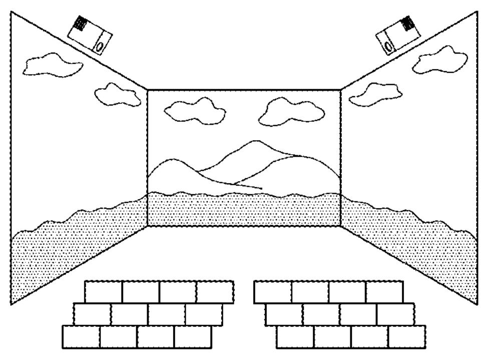
FIGS. 6 to 8 are diagrams showing examples of a plurality of projection surfaces.
Figure 7:
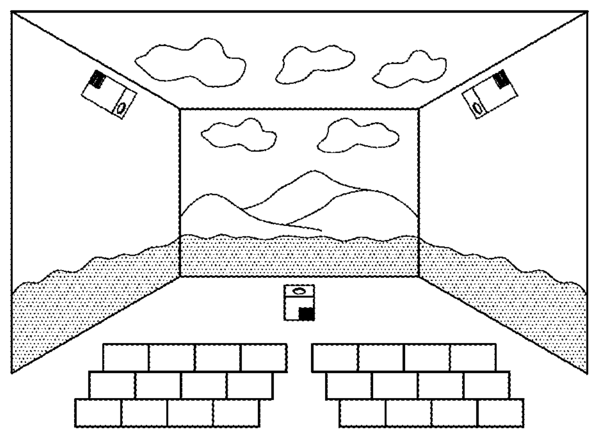
Figure 8:
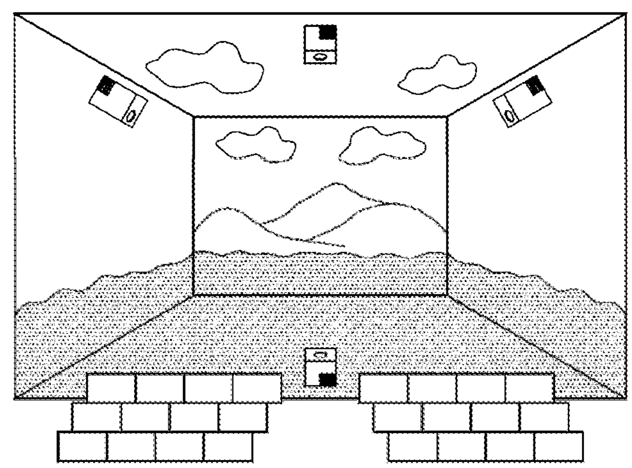

FIG. 6 is a diagram showing an example in which the plurality of projection surfaces are arranged on the front, left, and right sides with respect to the audience seats, FIG. 7 is a diagram showing an example in which the plurality of projection surfaces are arranged on the front, left, right, and top sides with respect to the audience seats, and FIG. 8 is a diagram showing an example in which the plurality of projection surfaces are arranged on the front, left, right, top, and bottom sides with respect to the audience seats.

Moreover, the plurality of projection surfaces 300 may be composed of various types of projection surfaces 300 such as screens, walls, etc. and may comprise different types of projection surfaces 300 at the same time.

Meanwhile, the images reproduced on the plurality of projection surfaces 300 may be projected by two or more projection devices installed in the theater, and these two or more projection devices may be implemented by including an optical system and a heating unit in various manners. For example, the projection devices may be implemented in various ways, such as by using a cathode ray tube (CRT), using a liquid crystal display (LCD), by digital light processing (DLP) using a digital micromirror device (DMD) chip, by liquid crystal on silicon (LCoS), etc. Moreover, the two or more projection devices may be electrically connected to an image management device and then integratedly controlled by the image management device, and the images can be projected on the plurality of projection surfaces 300 under the control of the image management device.

Meanwhile, the operation of reproducing the synchronized images on the plurality of projection surfaces (multi-projection operation) may not be performed throughout the entire running time but may be performed only at a specific scene or at a specific moment. For example, basically, an image may be projected only on a single projection surface (main projection surface), and then the multi-projection effect may be implemented on the plurality of projection surfaces only at a specific point of time or at a specific scene (e.g., a battle scene, a fire scene, a climate change, etc.)

Of course, the operation of reproducing the synchronized images on the plurality of projection surfaces may be performed throughout the entire running time.

The additional effect device 100 is a device for implementing the additional effects other than the images projected on the plurality of projection surfaces 300. Specifically, the additional effect device 100 is a device that adds an effect of increasing the visual reality or adds an effect that can be perceived by other senses than sight so as to increase the immersion and reality that the audiences can feel while watching multi-projection images. The additional effects that can be provided by the additional effect device 100 may include a sound effect, a wind effect, a smell effect, a fog effect, a temperature change effect, a laser effect, a light effect, a bubble effect, a water jet effect, a vibration effect, etc. as well as various effects associated with the five senses of human. Therefore, the additional effect device 100 may comprise various devices such as a speaker, an air blower, a fragrance diffuser, a fog machine, a heater, a cooler, a laser device, a bubble generator, an LED, a water jet, a vibration device, etc. which can stimulate the five senses of human.

Moreover, two or more additional effect devices 100 may be installed in the single theater. Specifically, the two or more additional effect devices 100 may be installed near the plurality of projection surfaces 300 as shown in FIG. 1 or may be installed at each audience seat as shown in FIG. 2. Otherwise, some may be installed near the projection surfaces, and some may be installed near the audience seats.

Furthermore, it is preferable that the additional effect devices 100 are installed where the audiences can best feel the corresponding additional effect depending on individual properties of the implemented additional effects. Specifically, in the case of the bubble effect, when the bubble generator is installed near the projection surface, the audience can best feel the effect, and in the case of the water jet effect, when the water jet is installed near the audience seat, the audience can best feel the effect. Therefore, it is preferable that the additional effect device 100 is disposed where the audience can best feel the corresponding effect.

Meanwhile, it is preferable that the two or more additional effect devices 100 are arranged in the same direction as the plurality of projection surfaces 300, because an additional effect that matches the direction of the plurality of projection surfaces 300 can be implemented by this arrangement.

These two or more additional effect devices 100 can change the direction of the additional effect in association with a change in viewpoint of the multi-projection images projected on the plurality of projection surfaces 300.

Figure 3:
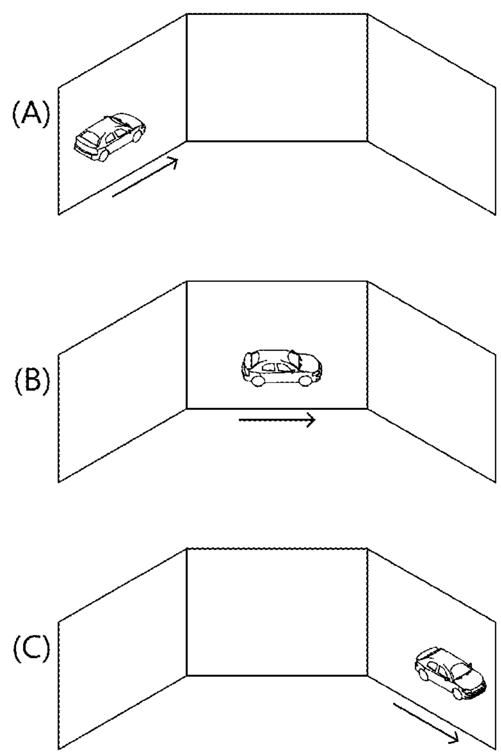
FIGS. 3 to 5 are conceptual diagrams showing the change in direction of additional effects.

When an object in the image moves between the projection surfaces 300 for example, the two or more additional effect devices 100 can change the direction of the additional effect. Referring to FIG. 3, when an object (vehicle) in the multi-projection images moves from the left projection surface (A) to the middle projection surface (B) and to the right projection surface (C), the two or more additional effect devices 100 can change the direction of the additional effect (e.g., wind). Specifically, the two or more additional effect devices 100 can change the direction (indicated by the arrows in the figure) of the additional effect (e.g., wind) depending on the movement direction of the object as the object in the image moves between the projection surfaces (A→B and B→C, visual handover between the projection surfaces), and thus the reality and immersion that the audiences feel can be maximized by the change in the direction of the additional effect. At this time, other additional effects (e.g., sound effect, smell effect, etc.) as well as the wind effect can be provided depending on the movement direction of the object. When various additional effects are provided depending on the movement direction of the object by the two or more additional effect devices 100 in the above manner, there is an advantage that the reality and immersion that the audiences fee can be maximized.

Figure 4:
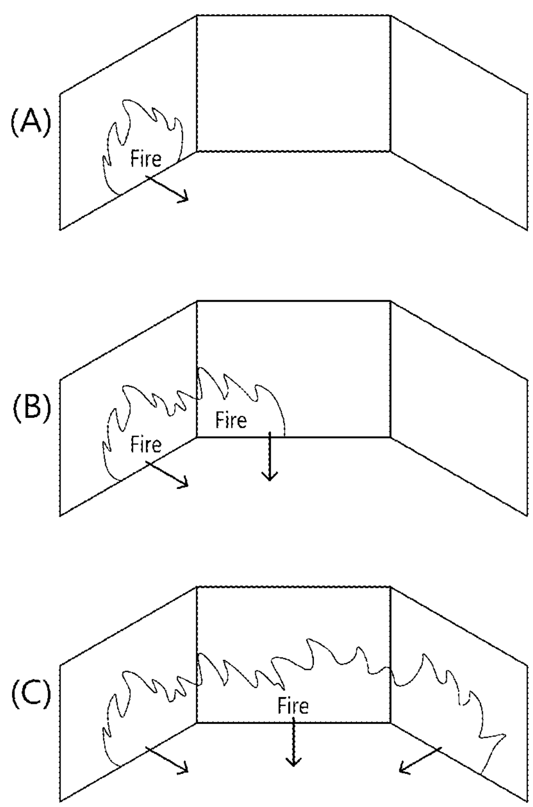

Moreover, when an environment in the image (e.g., weather, fire, etc) relatively changes between the projection surfaces 300, the two or more additional effect devices 100 may change the configuration of the direction of the additional effect. Referring to FIG. 4, when the environment in the image (e.g., fire) relatively changes between the left projection surface, the middle projection surface, and the right projection surface, the two or more additional effect devices 100 may change the configuration of the direction of the additional effect (e.g., temperature change). Specifically, as the fire (A) present only on the left projection surface spreads to the right projection surface (C) via the middle projection surface (B), the two or more additional effect devices 100 may configure the direction of the additional effect differently. For example, in the case of A, the two or more additional effect devices 100 may generate high-temperature heat only in the vertical direction of the left projection surface, in the case of B, the two or more additional effect devices 100 may generate high-temperature heat in the vertical direction of the left projection surface and the middle projection surface, in the case of C, and the two or more additional effect devices 100 may generate high-temperature heat in the vertical direction of all three projection surfaces. Therefore, the two or more additional effect devices 100 can provide the change in the configuration of the direction of the additional effect, thus maximizing the reality and immersion that the audiences feel.

Figure 5:
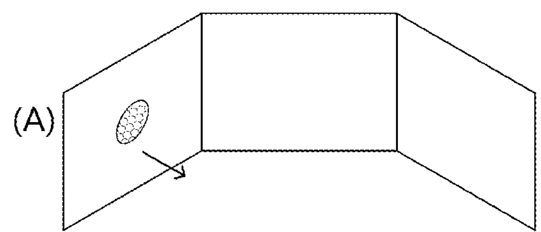
Figure 5:
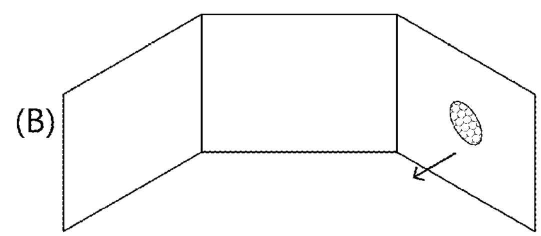
Figure 5:
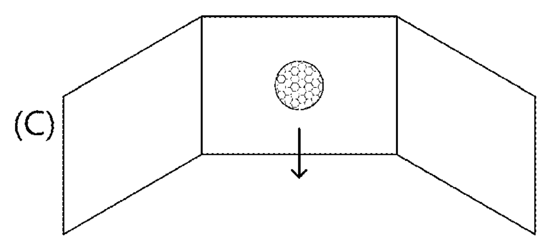

Furthermore, when a specific event in the image occurs only on a specific projection surface among the plurality of projection surfaces 300, the two or more additional effect devices 100 may implement the corresponding additional effect only in a direction that starts from the corresponding projection surface. Referring to FIG. 5, when a specific event (e.g., a change in the state of an object in the image, a change in the environment in the image, etc.) occurs only in the image on the left projection surface (A), only in the image on the right projection surface (B), or only in the image on the middle projection surface (C), the two or more additional effect devices 100 may implement the additional effect only in the direction that starts from each projection surface. Therefore, when a specific event occurs only on a specific projection surface, the audiences can recognize the additional effect (e.g., temperature change, smell, sound, etc.) associated with the specific event together with the directionality and thus can feel maximized reality and immersion.

Meanwhile, the two or more additional effect devices 100 may change the configuration of the direction of the additional effect by various methods that can be associated with a change in viewpoint of the multi-projection images in addition to the methods described above.

Moreover, the two or more additional effect devices 100 may change the direction of the additional effect by selective operation. For example, the additional effect devices 100 may be installed in various directions to be implemented and selectively operated to change the configuration of the direction of the additional effect.

Meanwhile, the two or more additional effect devices 100 may adjust the intensity of the additional effect in addition to the direction.

For example, when a scene in which a match is struck is reproduced, the two or more additional effect devices 100 may generate low-temperature heat (e.g., 20° C.), and when a scene in which a fire breaks out in the mountains is reproduced, the two or more additional effect devices 100 may generate high-temperature heat (e.g., 40° C.). Moreover, when a scene in which an aircraft passes is reproduced, the two or more additional effect devices 100 may adjust the intensity of the additional effect such that a stronger wind is generated than a case where a vehicle passes.

Furthermore, the two or more additional effect devices 100 may adjust the intensity or strength of various types of additional effects (sound, smell, fog, laser, light, bubbles, water jet, vibration, etc.) in addition to these additional effects such as heat, wind, etc. depending on the images.

The additional effect management device 200 is a device that controls the two or more additional effect devices 100.

The additional effect management device 200 may be electrically connected to the two or more additional effect devices 100 to control the respective additional effect devices 100. Moreover, the additional effect management device 200 may preferably be connected in parallel to the two or more additional effect devices 100 to control the respective additional effect devices 100 either simultaneously or individually. Meanwhile, the additional effect management device 200 may be connected to the two or more additional effect devices 100 in a wired or wireless manner.

Moreover, the additional effect management device 200 may transmit a control signal to each additional effect device 100 to control the operation of each additional effect device 100, eventually changing the configuration of the direction of the additional effect. The control signal may include time information data and operation information data. The time information data may include time point information at which each device is to operate, and the operation information data may include detailed operation information (output intensity, output type, etc.). More specifically, the time information data may be time information at which a specific scene of the image will be displayed, and the operation information data may be detailed operation information (output type, direction, intensity, etc.) of the devices which will operate at a specific scene of the image. Therefore, each additional effect device 100 can be synchronized with other additional effect devices 100 and the images, projected on the plurality of projection surfaces 300 based on the time information data and can implement an appropriate additional effect that can match the multi-projection images. Meanwhile, it is preferable that the time information data is generated based on time codes of multi-projection image contents such that the respective additional effect devices 100 can be easily synchronized with the multi-projection image contents. Moreover, the additional effect management device 200 may selectively operate the two or more additional effect devices 100 based on the control signal, and this selective operation can change the configuration of the direction of the additional effect.

Meanwhile, the additional effect management device 200 may be implemented with various electronic devices. For example, the additional effect management device 200 may be implemented in a single server or in such a manner that two or more servers are interconnected. Moreover, the additional effect management device 200 may be implemented in such a manner that a server and other electronic devices are inter-connected or implemented in arithmetic units other than the server.

Moreover, the additional effect management device 200 may be configured in the form of an integrated management device which is combined with an image management device which integratedly controls the two or more projection devices. Specifically, an integrated management device, which can perform all of the functions of the image management device and the additional effect management device 200, may be configured (preferably, in the form of a server) to control the projection devices and the additional effect devices 100. Here, the integrated management device may synchronize the two or more projection devices with the two or more additional effect devices 100 based on a common synchronization signal and may be connected in parallel to the respective devices to control the respective devices either simultaneously or individually.

Meanwhile, when the additional effect management device 200 is connected to the image management device to constitute an integrated management device, the integrated management device can correct image contents which are to be projected by the two or more projection devices and allow the corrected image contents to be projected on the plurality of projection surfaces 300 through the two or more projection devices.

Here, the integrated management device may correct the image contents based on information on the two or more projection devices or information on the plurality of projection surfaces 300. In this case, it is preferable that the correction of the image contents is performed so as to offset the difference in properties (brightness, color, image quality, material, structure, etc.) of the plurality of projection surfaces 300 or the difference in properties (lamp output, resolution, etc.) of the two or more projection devices (so as to create synchronized and unified images on the plurality of projection surfaces).

First, the correction of the image contents performed by the integrated management device based on the information on the plurality of projection surfaces 300 will now be described. The integrated management device may correct the image contents based on the information on the properties of the plurality of projection surfaces 300. Specifically, the integrated management device may correct the image contents so as to offset the difference in properties based on the information on the difference in properties (such as a difference in chromaticity, a difference in brightness, a difference in reflectivity, etc.) between the projection surfaces 300.

Representatively, the correction based on the information on the difference in chromaticity between the projection surfaces 300 will now be described (the process which will be described below can, of course, be applied to the correction based on the difference in brightness, difference in reflectivity, etc.). First, the integrated management device may calculate the information on the difference in chromaticity between the projection surfaces 300 based on chromaticity information of the respective projection surfaces 300. In detail, the integrated management device may set a single reference projection surface and then calculate information on a relative difference in chromaticity of each projection surface. For example, the information on the relative difference in chromaticity is calculated in such a manner that "projection surface A has a red (R) color level 50 higher than that of the reference projection surface, a green (G) color level 40 higher than that of the reference projection surface, and a blue (B) color level the same as that of the reference projection surface". After the information on the difference in chromaticity of the respective projection surfaces is calculated in this manner, the images may be corrected based on the calculated information in such a manner so as to "reduce the R color level of the image projected on projection surface A by 50, reduce the G color level by 40, and maintain the B color level", for example. Therefore, the difference in chromaticity of the projection surfaces can be offset.

Meanwhile, the analysis of the difference in properties of the plurality of projection surfaces 300 may be performed in various ways other than the method of setting the reference projection surface. For example, it is possible to calculate representative values (e.g., mean values, median values, mode values, etc.) for the properties of the plurality of projection surfaces 300 and then analyze the relative difference in properties based on the calculated representative values.

Moreover, the correction of the image contents performed by the integrated management device based on the information on the two or more projection devices will now be described. The integrated management device may correct the image contents based on the information on the properties of the projection devices. Specifically, the integrated management device may correct the image contents so as to offset the difference in properties based on the information on the difference in properties (such as a difference in contrast, difference in brightness, difference in resolution, difference in image quality due to physical distance, etc.) between the two or more projection devices.

Representatively, the correction based on the information on the difference in brightness between the two or more projection devices will now be described (the process which will be described below can, of course, be applied to the correction based on the difference in contrast, difference in resolution, difference in image quality etc.). First, the integrated management device may offset the difference in brightness between the projection devices by correction. For example, if it is assumed that the brightness of projection device A is 500 ANSI Lumens, the brightness of projection device B is 1000 ANSI Lumens, and the brightness of projection device C is 1500 ANSI Lumens, this difference in brightness may be offset by the image correction. In detail, the brightness ratio of the images projected by projection devices A, B, and C is corrected to 3:2:1, thus offsetting the heterogeneity of the images which may occur due to the difference in brightness between the devices.

Next, specific embodiments of the additional effect system according to the present invention will be described with reference to FIGS. 9 to 11.

While the additional effects may be configured in various ways as described above, the wind effect, the sound effect, and the vibration effect will be described below.

Figure 9:
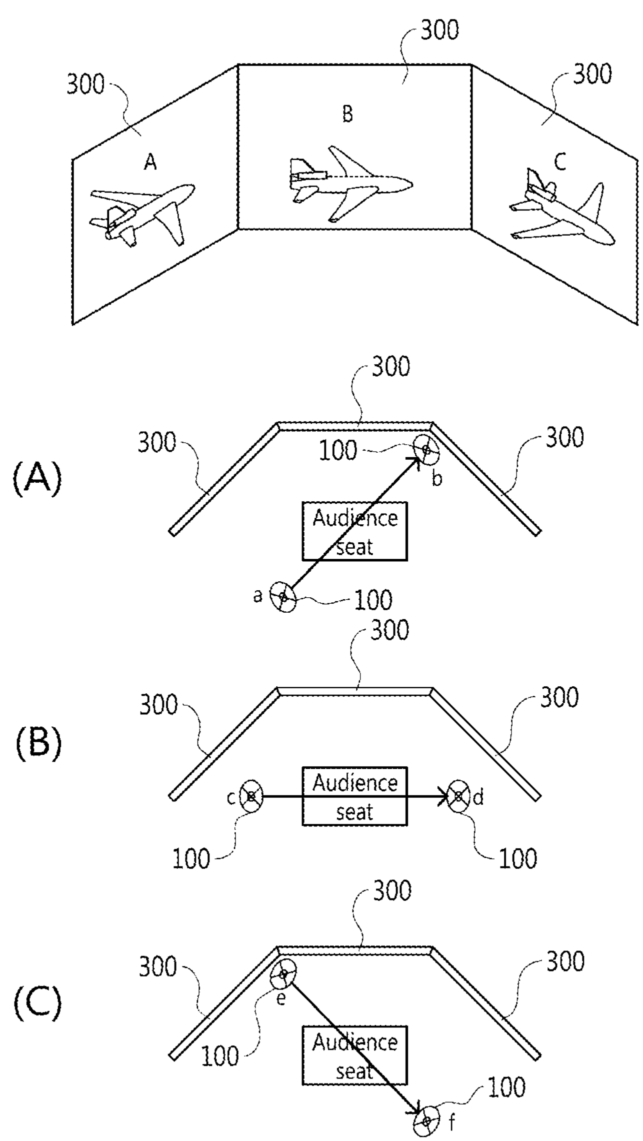
FIG. 9 is a conceptual diagram showing the change in directionality of a wind effect created by an additional effect system in accordance with an embodiment of the present invention.

Referring to FIG. 9, the additional effect system may implement a wind effect through two or more air blowers a-f distributed in the theater and change the direction of wind depending on the multi-projection images.

For example, when an object in the multi-projection images moves between the projection surfaces (A→B→C), the additional effect system may dynamically change the direction of the wind to a direction that the object on each projection surface moves. Specifically, when an object (e.g., aircraft) in the image moves to the right on projection surface A, the additional effect system may create the wind that matches the movement direction of the corresponding object by operating air blower a. Moreover, when the object in the image is handed over to projection surface B and moves to the right on projection surface B, the additional effect system may change the direction of the wind to a direction that matches the movement direction of the corresponding object by operating air blower c. Furthermore, when the object in the image is handed over to projection surface C and moves to the right on projection surface C, the additional effect system may change the direction of the wind to a direction that matches the movement direction of the corresponding object by operating air blower e.

In addition, if it is assumed that the object in the image of FIG. 9 moves to the left, the additional effect system may implement a wind effect that matches the movement direction of the object in the image by sequentially operating air blowers f, d, and a. In addition to these methods, the additional effect proving system can change the direction of the wind effect in various ways.

Meanwhile, even when an environment in the image relatively changes between the projection surfaces, the additional effect system can change the configuration of the direction of the wind through the two or more air blowers. For example, when the weather environment (e.g., tornado) in the image extends relatively in a direction of projection surface A→B→C, the additional effect system may change the configuration of the direction of the wind by the operation of the air blowers a-f in the figure and other air blowers (not shown).

Figure 10:
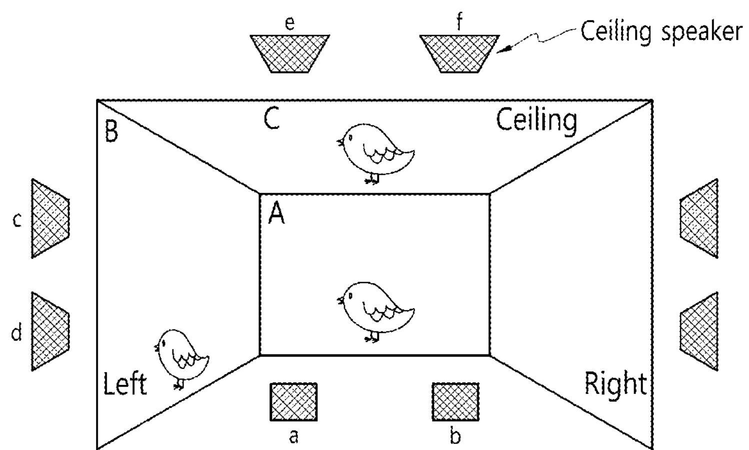
FIG. 10 is a conceptual diagram showing the change in directionality of a sound effect created by an additional effect system in accordance with an embodiment of the present invention.

Referring to FIG. 10, the additional effect system may implement a sound effect through two or more speakers a-f distributed in the theater and change the direction of sound depending on the multi-projection images.

For example, when an object in the multi-projection images moves between the projection surfaces (C→B→A), the additional effect system may change the direction of sound associated with the corresponding object. Specifically, when an object (e.g., bird) in the image is present on projection surface C, the additional effect system may output the sound associated with the corresponding object through speakers e and f. When the object (bird) in the image moves to projection surface B, the additional effect system may output the sound associated with the corresponding object through speakers c and d. Moreover, when the object (bird) in the image moves to projection surface A, the additional effect system may output the sound associated with the corresponding object through speakers a and b. Therefore, the direction of the location of the object in the multi-projection images can match the direction of the sound of the object by these operations.

Moreover, when an environment in the image relatively changes between the projection surfaces, the additional effect system may change the direction of the sound through the two or more speakers. For example, when an explosion occurs on projection surface A of FIG. 10 and occurs again in projection surface C, the additional effect system may change the output direction of the sound associated with the explosion (sound output from speakers a and b to speakers e and f).

Furthermore, when a specific event in the image occurs only on a specific projection surface among the plurality of projection surfaces, the additional effect system may output the sound associated with the event only through the speakers arranged around the corresponding projection surface. For example, when a battle scene is reproduced only on projection surface B of FIG. 10, the additional effect system may output the sound associated with the battle only through speakers c and d. Therefore, the directionality of the sound matching the visual direction of the event in the image can be implemented.

For reference, the additional effect system may install the speakers in various locations of the theater. For example, the additional effect system may install the speakers in various locations of the theater, such as the periphery of the plurality of projection surfaces, the ceiling, the rear of the audience seats, etc. Therefore, the present invention can provide the audiences with a three-dimensional sound effect, thus maximizing the immersion that the audiences feel.

Figure 11:
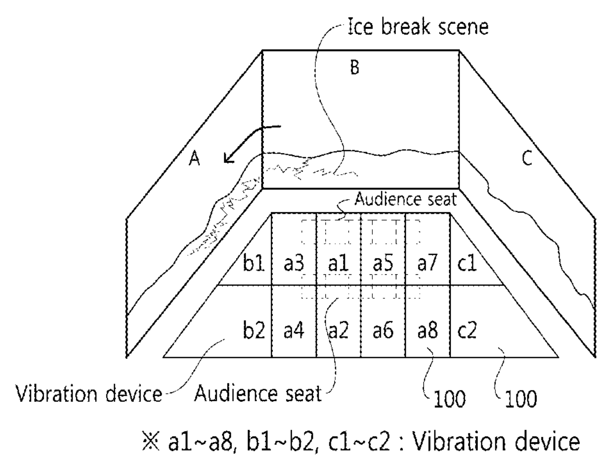
FIG. 11 is a conceptual diagram showing the change in directionality of a vibration effect created by an additional effect system in accordance with an embodiment of the present invention.

Referring to FIG. 11, the additional effect system may implement a vibration effect through two or more vibration devices distributed in a multi-projection theater and change the direction of vibration depending on the multi-projection images. Here, it is preferable that the two or more vibration devices are installed on the floor of the multi-projection theater.

For example, when an event associated with the occurrence of vibration (e.g., earthquake, break of ice, movement of an object such as a train, etc.) occurs in the multi-projection images, the additional effect system may change the direction of the vibration to a direction that the occurring event progresses. In this case, the additional effect system may sequentially vibrate vibrating plates, which are installed on the floor, in a direction that matches the direction of progress of the event, and this sequential vibration can change the direction of the vibration effect. Referring to FIG. 11, when the ice is broken in a direction such as B→A, the vibration devices vibrate sequentially (e.g., a1→a2→a3→a4→b1→b2). Therefore, the present invention can provide the audiences with maximized reality and immersion using these vibration devices distributed on the floor.

Next, an additional effect method in accordance with an embodiment of the present invention will be described with reference to FIG. 12.

Figure 12:
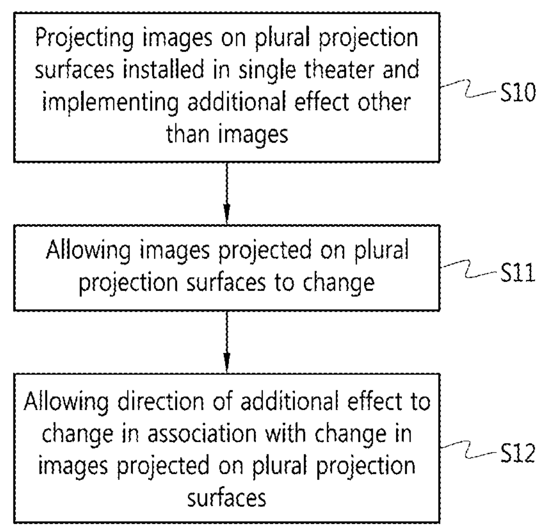
FIG. 12 is a flowchart showing an additional effect method in accordance with an embodiment of the present invention.

Referring to FIG. 12, the additional effect method in accordance with an embodiment of the present invention may comprise the step (S10) of projecting images on a plurality of projection surfaces installed in a single theater and implementing an additional effect other than the image.

Here, the additional effect may include a sound effect, a wind effect, a smell effect, a fog effect, a temperature change effect, a laser effect, a light effect, a bubble effect, a vibration effect, etc. as well as various effects associated with the five senses of human.

After step S10, the images projected on the plurality of projection surfaces are to change (S11). For example, an object in the image may move between the projection surfaces, an environment in the image may relatively change between the projection surfaces, or a specific event may occur on a specific projection surface among the plurality of projection surfaces.

When the images projected on the plurality of projection surfaces have changed in step S11, the configuration of the direction of the additional effect may change according to the change in the images (S12).

Here, it is preferable that the change in the direction of the additional effect and the visual change in the direction of the multi-projection images are performed when they match each other and are synchronized with each other.

Therefore, the additional effect method according to the present invention can provide additional effects of various directionalities that match the visual change in the direction of the multi-projection images, thus providing audiences with maximized three-dimensional effect and immersion.

Meanwhile, the additional effect method may be implemented in the form of a program and then stored in a recording medium readable by an electronic device or transmitted and received through a communication network. Moreover, the additional effect method may be implemented in the form of a program and then temporarily or permanently stored in various electronic devices.

Furthermore, the above-described additional effect method according to the present invention may have substantially the same features as the additional effect system according to the present invention, while they are in different categories. Thus, the above-described features associated with the additional effect system may be easily adapted and applied to the additional effect method.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. An additional effect system, comprising:

a plurality of projection surfaces installed in a single theater;

an image management device configured to correct images to be projected by a plurality of projection devices on the plurality of projection surfaces, wherein the images projected on the plurality of projection surfaces are synchronized with each other;

a plurality of additional effect devices configured to implement an additional effect other than the images projected on the plurality of projection surfaces; and an additional effect management device configured to control the plurality of additional effect devices, wherein the additional effect includes wind, smell, temperature change, water jet, vibration, or bubbles, wherein the plurality of additional effect devices is configured to, depending on the images projected on the plurality of projection surfaces, provide the additional effect, and selectively change a direction of the additional effect, wherein when a specific event in one of the images occurs only on a specific projection surface among the plurality of projection surfaces, the plurality of additional effect devices is configured to implement the additional effect only in a direction that starts from the specific projection surface, and wherein the image management device is configured to correct the images so as to offset a difference in brightness, color or material of the plurality of projection surfaces.

2. The additional effect system of claim 1, wherein the plurality of additional effect devices is configured to change the direction of the additional effect depending on the images projected on the plurality of projection surfaces.

3. The additional effect system of claim 2, wherein when an object in one of the images moves between the plurality of projection surfaces, the plurality of additional effect devices is configured to change the direction of the additional effect depending on a movement direction of the object.

4. The additional effect system of claim 2, wherein when an environment in one of the images changes between the plurality of projection surfaces, the plurality of additional effect devices is configured to change a configuration of the direction of the additional effect.

5. The additional effect system of claim 1, wherein the additional effect management device is configured to transmit a control signal to the plurality of additional effect devices, and wherein the control signal includes time information and operation information.

6. The additional effect system of claim 5, wherein the plurality of additional effect devices is synchronized with each other -and with the images, projected on the plurality of projection surfaces, based on the time information.

7. The additional effect system of claim 1, wherein the additional effect is wind and the plurality of additional effect devices comprises a plurality of air blowers, wherein the plurality of air blowers is distributed in the single theater, and wherein the additional effect system is configured to change a direction of the wind through the two or more air blowers.

8. The additional effect system of claim 7, wherein when an object in one of the images moves between the plurality of projection surfaces, the additional effect system is configured to change a direction of the wind through the plurality of air blowers.

9. The additional effect system of claim 7, wherein when an environment in one of the images changes between the plurality of projection surfaces, the additional effect system is configured to change a direction of the wind through the plurality of air blowers.

10. The additional effect system of claim 1, wherein the additional effect is vibration and the plurality of additional effect devices comprises a plurality of vibration devices, and wherein the plurality of vibration devices is distributed on a floor of the single theater.

11. The additional effect system of claim 10, wherein the plurality of vibration devices is configured to implement a directionality of the vibration by a sequential operation.

12. The additional effect system of claim 10, wherein, when an object in one of the images moves between the plurality of projection surfaces, the additional effect system is configured to change the direction of the vibration through the plurality of vibration devices.

13. A non-transitory recording medium readable by an electronic device, in which a method for implementing an additional effect is record as a program, the method comprising:

(a) causing multi-projection images to be projected on a plurality of projection surfaces installed in a single theater by a plurality of projection devices wherein the images projected on the plurality of projection surfaces are synchronized with each other; and (b) causing an additional effect other than the images to be implemented by a plurality of additional effect devices, wherein the additional effect includes wind, smell, temperature change, water jet, vibration, or bubbles, and wherein the plurality of additional effect devices provides the additional effect depending on the multi-projection images projected on the plurality of projection surfaces, and the plurality of additional effect devices selectively changes the direction of the additional effect, wherein when a specific event in one of the images occurs only on a specific projection surface among the plurality of projection surfaces, the plurality of additional effect devices is configured to implement the additional effect only in a direction that starts from the specific projection surface, and wherein the multi-projection images are corrected so as to offset a difference in brightness, color or material of the plurality of projection surfaces.

14. An additional effect method for multi-projection, the method comprising:

projecting, by a plurality of projection devices, a plurality of images on a plurality of projection surfaces installed in a single theater wherein the images projected on the plurality of projection surfaces are synchronized with each other;

implementing, by a plurality of additional effect devices, an additional effect other than the images wherein the additional effect includes wind, smell, temperature change, water jet, vibration, or bubbles; and controlling, by an additional effect management device, the additional effect depending on the images projected on the plurality of the projection surfaces, wherein a direction of the additional effect is selectively changed based on the images, wherein when a specific event in one of the images occurs only on a specific projection surface among the plurality of projection surfaces, the plurality of additional effect devices is configured to implement the additional effect only in a direction that starts from the specific projection surface, and wherein the images to be projected on the plurality of projection surfaces are corrected so as to offset a difference in brightness, color or material of the plurality of projection surfaces.

15. The additional effect system of claim 1, wherein the additional effect is smell.

* * * * *